United States Patent [19]
Parrish et al.

[11] Patent Number: 5,752,245
[45] Date of Patent: May 12, 1998

[54] OBJECT-ORIENTED SYSTEM FOR CONFIGURATION HISTORY MANAGEMENT WITH A PROJECT WORKSPACE AND PROJECT HISTORY DATABASE FOR DRAFT IDENTIFICATION

[75] Inventors: Jeff W. Parrish, Los Altos; Farzin Maghoul, Hayward, both of Calif.

[73] Assignee: Object Technology Licensing Corporation, Cupertino, Calif.

[21] Appl. No.: 353,027

[22] Filed: Dec. 9, 1994

[51] Int. Cl.$^6$ .................................................. G06F 17/30
[52] U.S. Cl. .................................. 707/10; 707/1
[58] Field of Search .................... 395/600, 700, 395/182.18, 800, 156, 650, 221, 601, 610, 200.1

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 395/704 |
| 4,891,630 | 1/1990 | Friedman et al. | 345/156 |
| 4,953,080 | 8/1990 | Dysart et al. | 395/614 |
| 5,041,992 | 8/1991 | Cunningham et al. | 395/135 |
| 5,050,090 | 9/1991 | Golub et al. | 364/478.05 |
| 5,060,276 | 10/1991 | Morris et al. | 382/151 |
| 5,075,848 | 12/1991 | Lai et al. | 395/479 |
| 5,093,914 | 3/1992 | Coplien et al. | 395/704 |
| 5,119,475 | 6/1992 | Smith et al. | 395/353 |
| 5,125,091 | 6/1992 | Staas, Jr. et al. | 395/671 |
| 5,133,075 | 7/1992 | Risch | 395/800 |
| 5,136,705 | 8/1992 | Stubbs et al. | 395/183.03 |
| 5,151,987 | 9/1992 | Abraham et al. | 395/182.18 |
| 5,181,162 | 1/1993 | Smith et al. | 395/792 |
| 5,313,636 | 5/1994 | Noble et al. | 395/601 |
| 5,315,703 | 5/1994 | Matheny et al. | 395/507 |
| 5,315,709 | 5/1994 | Alston, Jr. et al. | 395/606 |
| 5,317,741 | 5/1994 | Schwanke | 395/703 |
| 5,321,841 | 6/1994 | East et al. | 395/677 |
| 5,325,481 | 6/1994 | Hunt | 395/347 |
| 5,325,522 | 6/1994 | Vaughn | 395/601 |
| 5,325,524 | 6/1994 | Black | 395/610 |
| 5,325,533 | 6/1994 | McInerney | 395/701 |
| 5,361,357 | 11/1994 | Kionka | 395/709 |

*Primary Examiner*—Thomas G. Black
*Assistant Examiner*—Greta L. Robinson
*Attorney, Agent, or Firm*—Bookstein & Kudirka

[57] ABSTRACT

A distributed program configuration database system is designed for use on a client-server network. The system consists of a plurality of program servers which maintain version information for various program components. A program developer, upon logging into a client terminal on the network, establishes a workspace or project and connects with one of the servers. After connection to the server has been made, a draft of the program configuration is retrieved from the server. The configuration draft may include information for constructing some of the program components and "bridge" information identifying other program servers where additional program components are located. The workspace uses the component information to assemble components and the bridge information to connect to other servers and retrieve the remaining components in order to assemble the complete source code for a program in the workspace.

24 Claims, 9 Drawing Sheets

OBJECT-ORIENTED SYSTEM FOR CONFIGURATION HISTORY MANAGEMENT WITH A PROJECT WORKSPACE AND PROJECT HISTORY DATABASE FOR DRAFT IDENTIFICATION

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office. All other rights are expressly reserved.

FIELD OF THE INVENTION

This invention relates generally to improvements in computer systems and, more particularly, to object-oriented software for managing changes, revisions and modifications in software program development projects.

BACKGROUND OF THE INVENTION

The heart of a modern computer system is the software program which controls and coordinates the operation of the hardware components. The series of commands or steps which comprise the program are generally stored in a text file called a source code file. The program statements in the source code file agree generally human-readable and can be composed and edited by the program developer. As will be explained in more detail below, the human-readable source code is converted, or compiled, by another program called a compiler into binary object code which can actually be executed by the hardware.

When computer systems were first developed, both the hardware and the software programs were considerably simpler than they are today. The hardware consisted of a single processor and early software programs were relatively small and compact and generally consisted of a single text file which held the source code.

As both hardware and software became more sophisticated and software development progressed, programs grew in size and complexity. Therefore, it became necessary to break the program into smaller, more easily understood pieces. Breaking the program into pieces also had the advantage that, during program development, each piece of source code could be separately compiled into object code, a process that was much faster than compiling the entire program. Also, due to the complexity and time required to develop reliable software code, techniques were developed that allowed code pieces which were already developed to be reused in different parts of a single program and also between two separate programs.

For example, structured programming techniques were developed where most of the source code was written as separate subroutines and the main program simply calls the subroutines. In many cases it was convenient to store collections of the subroutines in separate files.

With the advent of object-oriented programming, the potential of reusing portions of prewritten code is greatly increased, but the complexity of the programs has increased even further. More particularly, as will hereinafter be described in more detail below, object-oriented programs consist of a collection of inter-related objects. In many modern programming languages each of these objects is typically defined by a header file which contains definitions of the data structures and the subroutines, or methods, which comprise the object. The object further has a source code file which contains the code which implements the methods. In a modern object-oriented program, the number of objects easily climbs into the hundreds and, in some cases, into the thousands. As with structured programs, collections of objects are generally placed in separate files so that a complex program may include hundreds of files.

Since the objects are interrelated, it is common for program files to reference other program files. This interrelation necessitates some type of file management to keep track of the files during compilation. For example, a typical program development sequence is shown in greatly simplified form in FIG. 1.

More particularly, the sequence starts in step 100 and proceeds to step 102 where overall design criteria are established for the software program. Then, in step 104, a program developer composes source code in order to control the computer to meet the design criteria established in step 102. As previously mentioned, the source code may comprise many different files which correspond to classes for creating, menus, icons, bitmaps, text strings, screen layouts and other components of the system.

Next, in step 106, the source code is compiled by a compiler program into object modules. Each separate source file may be compiled separately into a corresponding object module which contains binary code. The separate object modules are linked together in step 108 by means of a linker program to generate an executable program (which can actually be run on a computer). Next, in step 110, the executable program is run and evaluated against the design criteria established in step 102. If, based on the results of the evaluation in step 110, the program is found to meet design criteria in step 112 then the program development is finished (indicated by step 116). However, if the program is found not to meet design criteria, the source code is edited in step 114 and the compilation and linking steps, 106 and 108, are then repeated until the program eventually meets design criteria.

Generally, the editing of the source code in step 114 involves editing of some, but not all of the source code files. However, since some of the files may reference other files, certain source code files may have to be recompiled even if they have not themselves been modified. For example, if a subobject is modified the object file which contains a reference to the subobject may also have to be recompiled in step 106. Thus, it is necessary to keep track of references between files so that different changes or revisions to a file will reflect changes to other related files.

One conventional way to maintain references between source code files is a "project" file. The project file is a simplified database which maintains a list of source code files along with the references between the files and the current state of each file (whether the file has been modified or not). Generally, the file state is maintained by a date and time stamp which is applied to each source code file when the file is modified. When a project file is used, the compilation step takes the form of a project "build" during which all source code files in the project database which need recompiling are sequentially compiled. The project file also contains a date and time stamp for the last build time. The next time the executable program is built, the program development management software compares the time stamp of each source code file to the time stamp saved in the project file during the last program build. Those source codes files which have a time stamp later than the last build date are recompiled before linking.

The project file approach works well for small and medium size projects where only a few people are working on the project at the same time, however, in large projects, the project file approach becomes a bottleneck. In such large projects, there are often program development teams which share objects and other program components within a project and between projects. Accordingly, it is necessary in large projects to have some type of source code control program which can coordinate use of the these objects among projects to insure that the correct version is used during compilation.

Several commercial source code control systems are presently available including RCS, SCCS, and MPW Projector, however, these systems manage current versions of the source code for individual files and are not capable of managing any other additional information that can be used to control the code, for example, extra configuration information. Further these systems cannot provide history information concerning versions of the relationships between files which are useful for comparison and merging purposes.

Accordingly, it is an object of the present invention to provide a program development management system which supports the reliable sharing and reuse of objects and other program components by a program development team.

It is another object of the present invention to provide a program development management system which maintains configuration and revision information and which can store different code versions developed over time.

It is still a further object of the present invention to provide a program development management system which utilizes a distributed database operating over a network.

SUMMARY OF THE INVENTION

The foregoing objects are achieved and the foregoing problems are solved in one illustrative embodiment of the invention in which a distributed program configuration database system is designed for use on a client server network. The system consists of a plurality of program servers which maintain version information for various program components.

A program developer, upon logging into a client terminal on the network, establishes a workspace or project and connects with one of the servers. After connection to the server has been achieved, a draft of the program configuration is retrieved from the server. The configuration draft may include information for constructing some of the program components and "bridge" information identifying other program servers where additional program components are located. The workspace uses the component information to assemble components and the bridge information to connect to other servers and retrieve the remaining components in order to assemble the complete source code for a program in the workspace.

The servers may be shared among projects and store several versions of the code. Methods are provided in the servers to retrieve code versions and to generate code configurations.

DETAILED DESCRIPTION OF AN ILLUSTRATIVE EMBODIMENT

Figure 1:
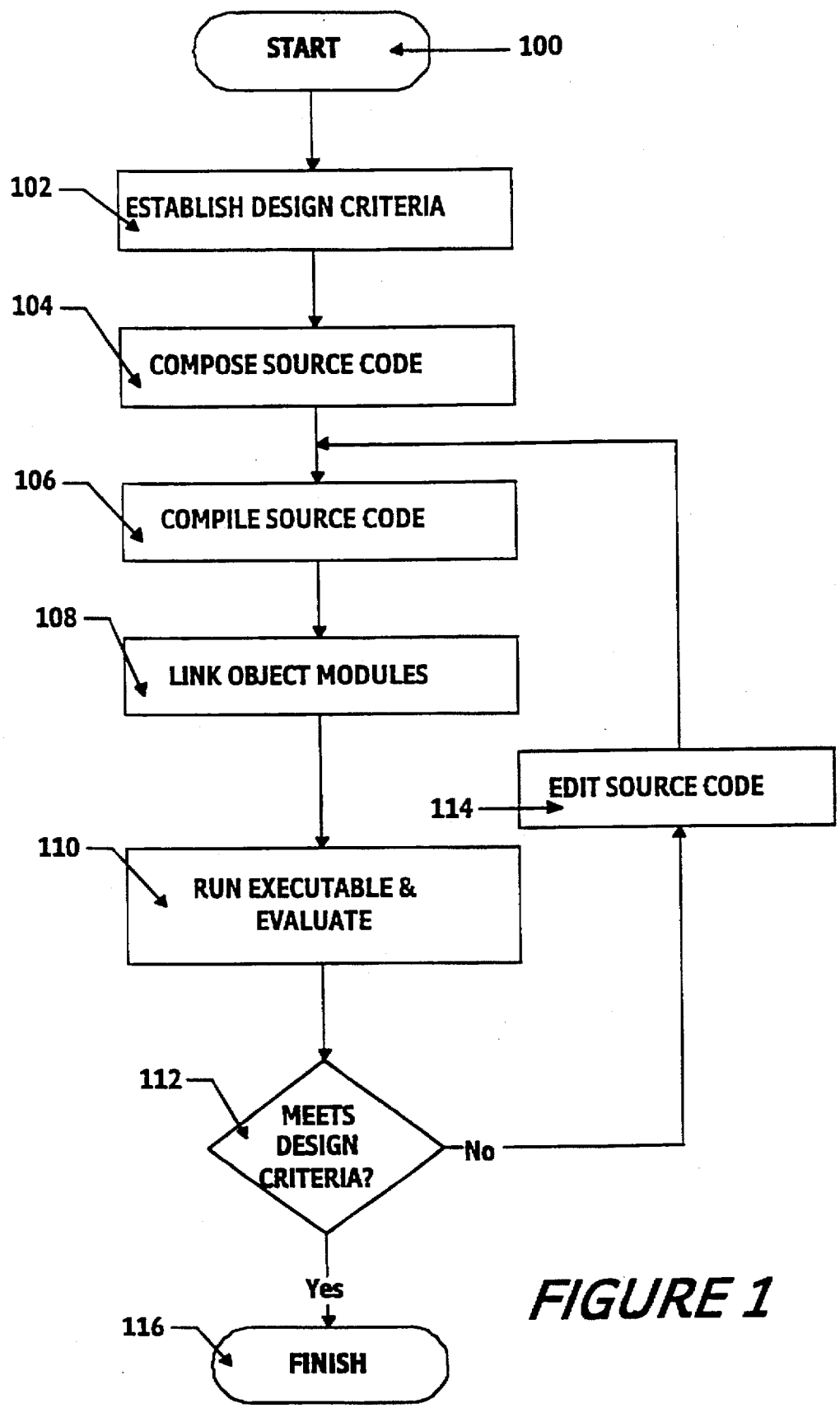
FIG. 1 is a simplified schematic diagram of a program development cycle.
Figure 2:
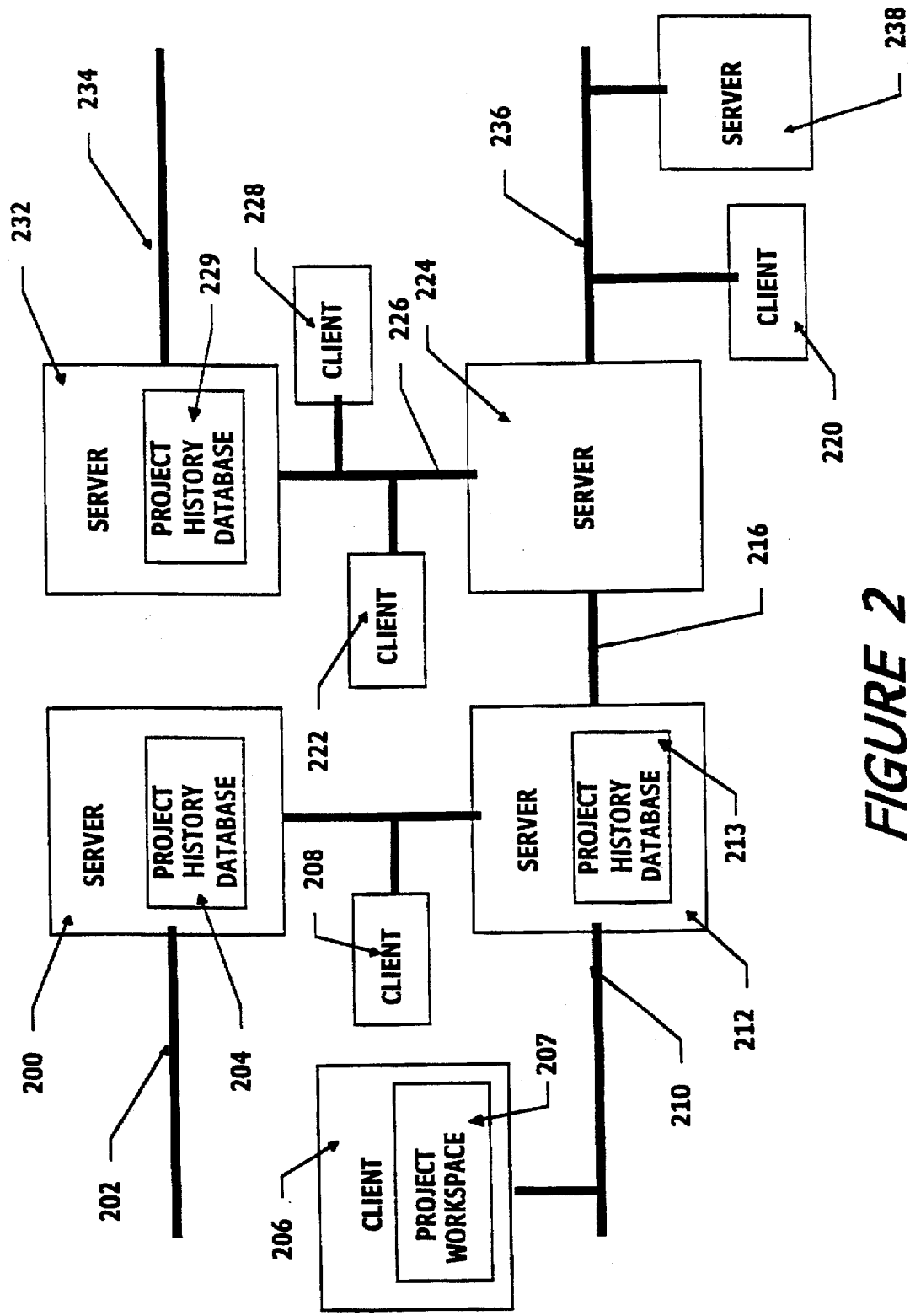
FIG. 2 is a simplified diagram of a prior art client server system on which the present invention can run.

The Project History Server of the present invention can be implemented in several ways. The simplest implementation is to use a single, centralized database contained in a local server node to hold a complete list of program components for all projects on the system. However, a preferred implementation uses several history servers connected to a network and distributes the program components over these servers. An example of such a distributed system is shown in FIG. 2. FIG. 2 illustrates a computer network arranged in a "client-server" configuration comprising a plurality of client nodes 206, 208, 220, 222 and 228 which may, for example, be workstations, personal computers, minicomputers or other computing devices on which run application programs that communicate over various network links including links 202, 210, 216, 226, 234 and 236 with each other and with server nodes, such as nodes 200, 212, 224, 232 and 238. The server nodes may contain specialized hardware devices and software programs that can provide a service or set of services to all or some of the client nodes. The client nodes are the users of the various network services which, in turn, are provided by the server nodes Typically, project history databases 204, 213 and 229 are located in several of the server nodes, such as nodes 200, 212 and 232. A client node, such as client node 206, can access one or more of the databases 204, 213, 229 by initializing a project workspace 207 in node 206 and connecting to one of the server nodes which contains an entry associated with that project, such as database 204 in node 200, entering a project identifier or name and retrieving both the program components stored in database 204 and also network addresses of other servers which contain components of the project. The mechanism of initializing a project workspace, connecting to a history server and retrieving component drafts or versions will be discussed in detail below.

Figure 3:
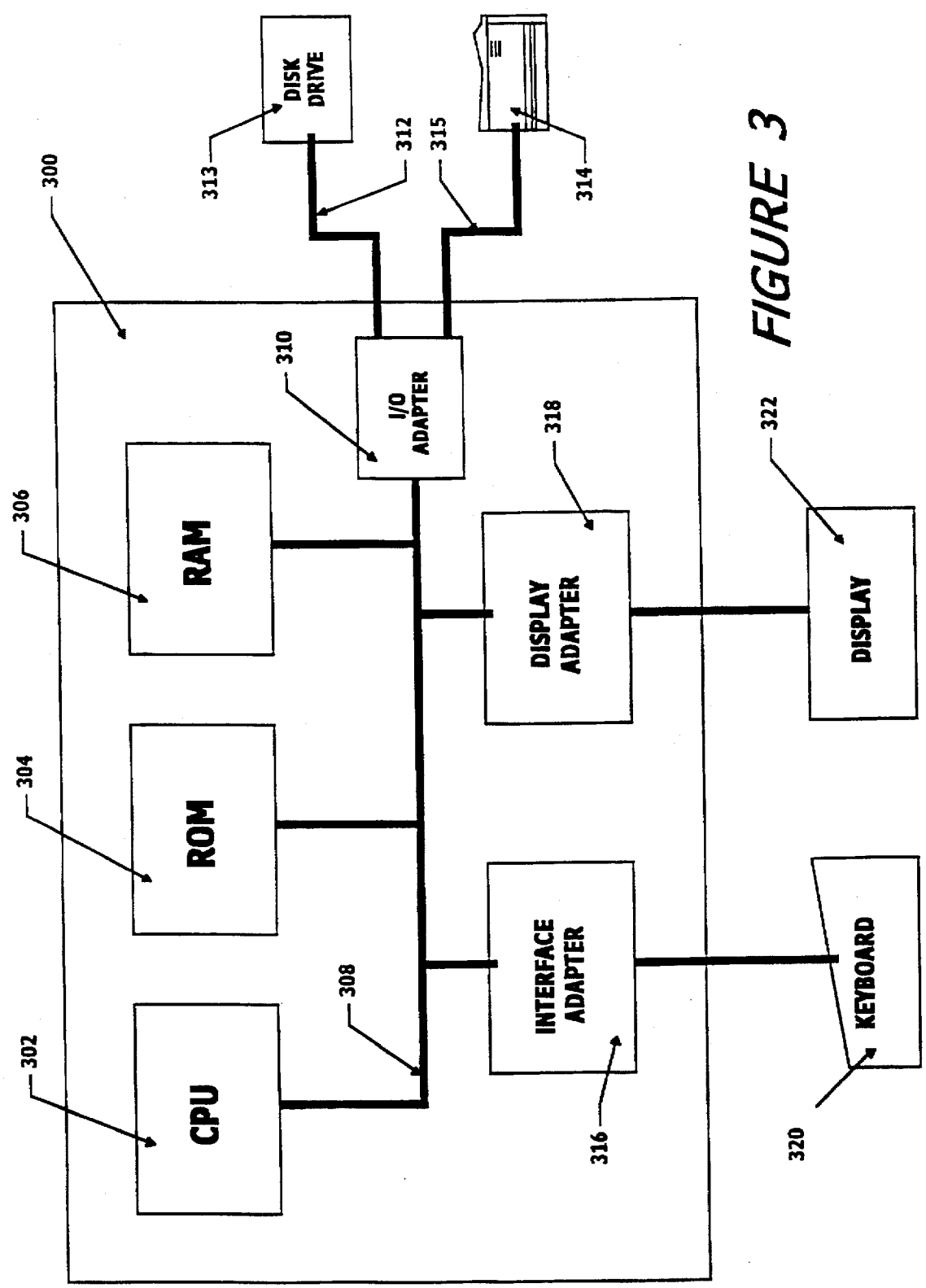
FIG. 3 is a simplified schematic of a personal computer system which can comprise either the client or the server node illustrated in FIG. 2.

Both the client and server portions of the invention are preferably practiced in the context of an operating system resident on a personal computer such as the IBM PS/2, or Apple, Macintosh, computer. A representative hardware environment which may comprise either the client node or the server node in FIG. 2 is depicted in FIG. 3, which illustrates a typical hardware configuration of a computer 300 in accordance with the subject invention. The computer 300 is controlled by a central processing unit 302, which may be a conventional microprocessor; a number of other units, all interconnected via a system bus 308, are provided to accomplish specific tasks. Although a particular computer may only have some of the units illustrated in FIG. 3 or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322 such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by definingly public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward, procedural calls.

In the same way that an application framework provides the developer with prefab functionality for an application program, a system framework for handling software program components, such as that included in a preferred embodiment, can provide a prefab functionality for system level services which developers can modify or override to create customized solutions, thereby avoiding the awkward procedural calls necessary with the prior art application frameworks programs.

In accordance with the principles of the invention, the program development management system comprises two major parts: the Project and the Project History. The Project, or the Workspace, is located in one of the client terminals and is where applications, shared libraries, etc. are developed. A Project History is a database which maintains various drafts, or versions, of the Project and is located in one or more server nodes. Therefore, Projects and Project Histories have a client-server relationship. Logically, a Project is a client of a single Project History even though, physically, portions of that single Project History may be located in several different servers so that, in fact, the Project will be connected to, and using, several different Project History Servers simultaneously.

A Project History server manages a single history database which is responsible for maintaining current drafts and histories of program components which are part of the client Project. Since all access to a history database is via its one and only history server, history servers are responsible for coordinating concurrent access to history database. In accordance with a preferred embodiment, the history database is preferably an object-oriented database. The details of such a database are not important for an understanding of the present invention, but a database suitable for use with the present invention is discussed in detail in U.S. Pat. No. 5,325,533 which is assigned to Taligent, Inc., the assignee of the present invention.

THE PROJECT

Figure 4:
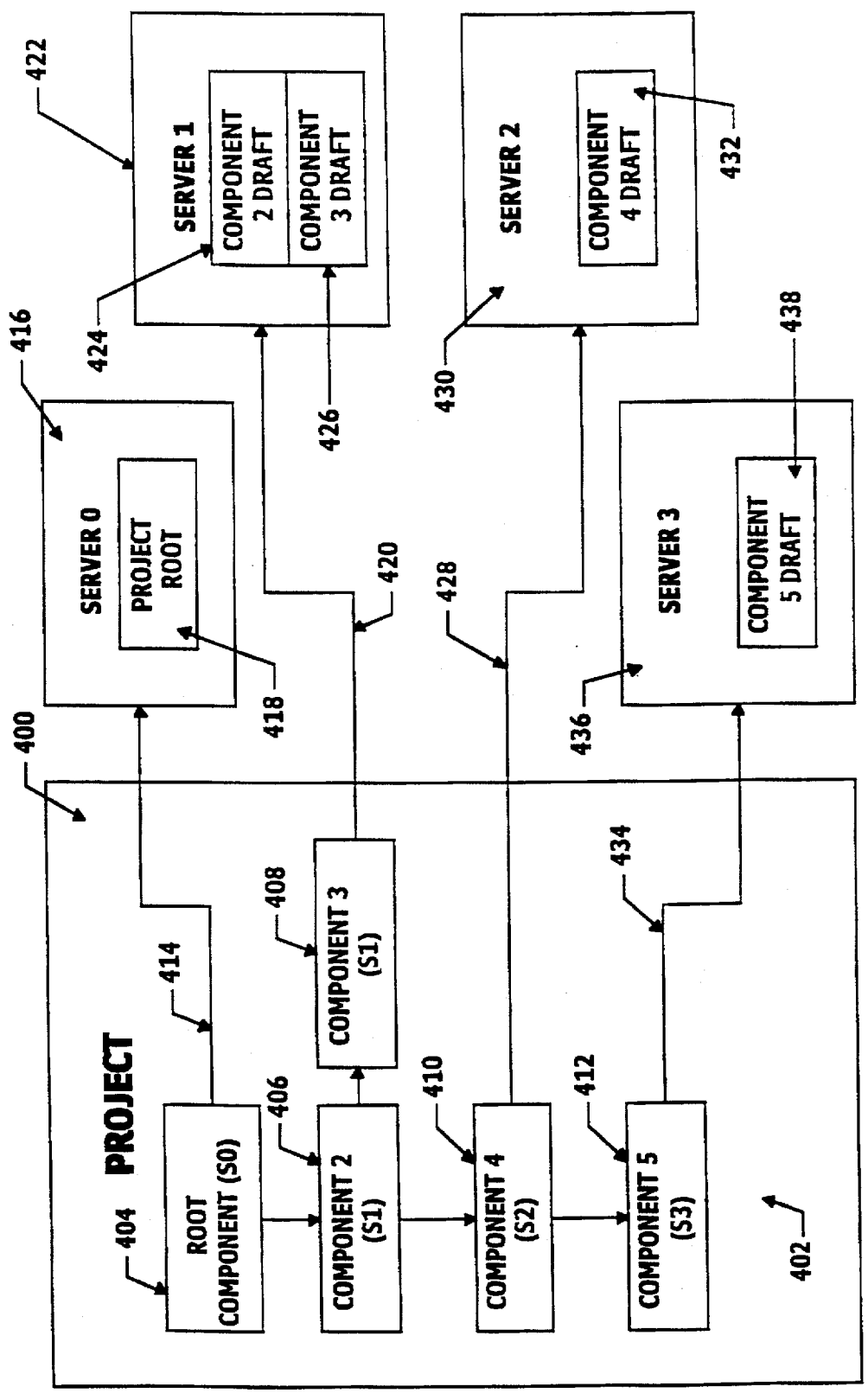
FIG. 4 is an illustrative block diagram showing the arrangement of program components within a project and the relationship of the program components to different program history servers.
Figure 5:
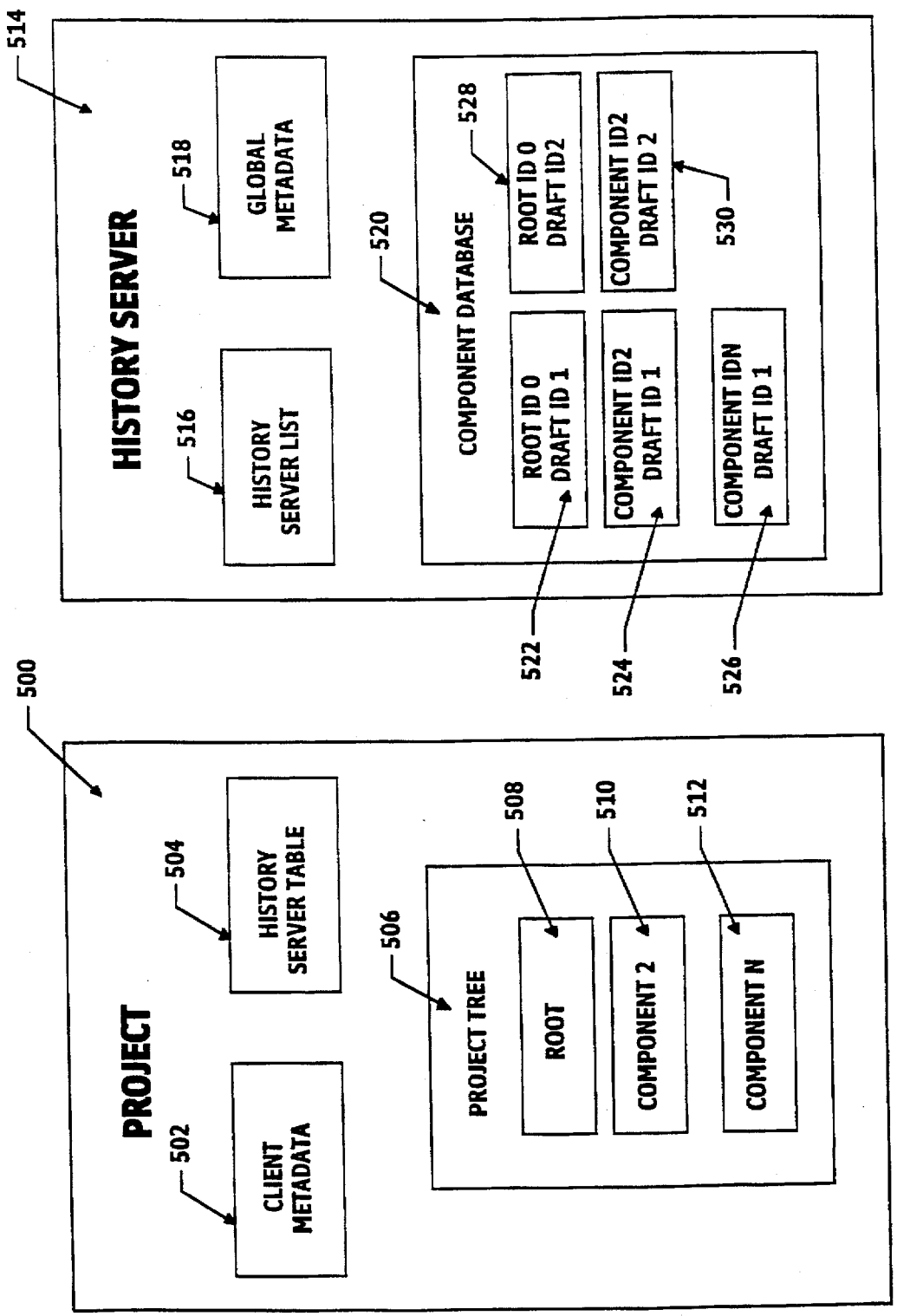
FIG. 5 is a block schematic diagram of a Project and a Project History Server illustrating the major components of each.

A simplified diagram illustrating program components in a project is shown in FIG. 4. FIG. 5 shows the major components of a Project and a Project History server. Within the Project 500, the program components 508–512 are organized in a single tree 506 rooted at the project, or root, component 508. This tree is shown in more detail in FIG. 4 where the tree 402 is comprised of components 404–412. The program components 404–412 might comprise, for example, program code defining and implementing classes used to construct objects, program code used to define and implement menus, binary images for bitmaps and icons, text string files and other conventional program components.

As shown in FIG. 4, program components 404–412 are each associated with a program history server on which the previous drafts or revisions of the component are stored. For example, root component 404 is associated with erver 0 (denoted by numeral 416 which stores a draft 418) as indicated schematically by arrow 414. Similarly, components 2 and 3 (406 and 408, respectively) are associated with server 1 (422, storing drafts 424 and 426) as indicated by arrow 420. Component 4 (410) is associated with server 2 (430, storing draft 432) and component 5 (412) is associated with server 3 (436, storing draft 438).

In order to maintain consistent configurations, a rule is imposed that a single history server can only be associated with exactly one subtree. Thus, according to this rule, component 412 can be associated with history server 436 or history server 430, but it can not be associated with history server 422 because the component's parent, component 410 is already associated with history server 430.

The logical model is that there is a single history server per Project, but the components which comprise the Project may be physically distributed in multiple history servers as illustrated in FIG. 4. In accordance with the principles of the invention, the program components which comprise the Project are assembled at the time that the Project is initialized. In particular, the Project has persistent memory associated with it which identifies the server node where the history server resides for the root component of the Project.

During the process of initializing the Project workspace, the stored history server identity is used to connect to this history server and retrieve a specific configuration of the Project. As will hereinafter be explained in detail, this configuration contains information concerning components physically located on that history server, but also information which may lead to connections to other history servers. During the process of initialization, the components located in the history server are added to the Project workspace component tree 506. In accordance with the invention, the other history servers are connected automatically and the program developer does not need to know about the additional connections (unless some of the servers are not reachable or are no longer in existence-which are exceptional cases). During the connection process, the Project also creates and maintains a table 504 of all history servers to which it is connected. This table and the history server connections persist for the life of the project.

In the Project workspace and the History Servers there are various kinds of components and each component has a set of properties. A component kind or a property kind is identified by a name (represented as text). For example, the name Class is a component kind which represents a C++ class. Similarly, the name Implementation is a property kind which represents an attribute (in this case an implementation) of a given component. There can be no two component kinds which are identified by same name; the same holds true for property kinds. One important property associated with each component is a "Members" property which contains a list of all subcomponents associated with that component. The Members property allows the subcomponents to be located for each component.

For efficiency, the workspace (and the program history servers) identify each component kind and each property kind by a string token id (an index number representing a text string). The string token ids are not persistent however, so the index value of a given text string may vary between sessions and machines. This implies that the string token id value may not be the same in a history and the workspace for the same component kind.

Each program component in a Project is identified by a pair of unique IDs. The first ID, called the component ID, represents a component independent of its version. The second ID called the version ID, identifies which version of the component. Together, the two ID's uniquely identify one version of a component. During the creation of a new component in the Project workspace, both a new, unique component ID and a new, unique version ID are created. Multiple components with the same component ID can exist simultaneously within a Project, but each must have a unique version ID. Furthermore, there can only be zero or one version of each component in the Project that is associated with the current configuration.

Ultimately, components can only be uniquely identified by both their component and version ID. However, in order to facilitate the common case of accessing a component in the current configuration the Project provides a means whereby components can be accessed with only their component ID. In this case, the Project assumes that the desired version of the component is the one in the current configuration.

The Project's ability to identify which component versions are contained within the current configuration allows a level of indirection when accessing components that obviates the need for locating and updating existing references to that component when the version changes. For example, no references are updated when a new version of component is created or another version is retrieved. Without this indirection the system would have to locate and update the version ID part of every reference to the modified component contained within any property in the database.

Special information called metadata is used to associate a set of properties with a specific component kind. The metadata for all of the components in the Project defines the "schema" of the Project workspace and this schema is stored in persistent storage and read in by the Project workspace as part of initialization and stored in a file 502 as illustrated in FIG. 5.

A workspace schema has the potential to change over various release, of workspace, e.g., there may be new component kinds or the property set for a specific component kind may change. The history servers connected to a new release of the workspace must have the ability to cope with the changes so that old program histories are still usable. More particularly, the possible changes to a schema of a Project workspace include the following:

Σ adding/deleting component kinds

Σ adding/deleting properties associated with a component kind or a change in the component's metadata.

Σ adding/deleting a property kind

Σ changing the definition of a property kind (the streamed information of the property kind has changed between releases of workspace)

As will be hereinafter described in detail, when the Project workspace connects to a history server, in the process of establishing the connection, the history server will receive enough information to detect all these changes except the last one (where the definition of a property kind may change). S1 the Project history does not interpret the definition of a property kind, the Project workspace must handle this last change by maintaining versioning of the Store and Fetch functions used to store and retrieve the Project workspace persistent data.

In accordance with the object-oriented nature of the program development system, both the component tree and its nodes would be encapsulated in objects which are combined in another object, TProgramWorkspace which represents the Project. The component tree is encapsulated in an object along with an iterator which "walks" over all of the tree branches and returns the component IDs. The component tree can be implemented using conventional tree structures and will not be discussed further herein. The Project workspace contains a THistoryManager object which controls access to the Project History Server.

THE PROJECT HISTORY SERVER

The components of a History Server are shown in simplified form in FIG. 5. These components are part of a THistoryServer object which controls access to the components stored in the database. Each History Server maintain a list 516 of the connection information regarding other History Servers 5 referenced by the project configurations stored on that Server. However, a History Server never directly establishes a physical connection with other History Servers (a History Server is never a "client" of another History Server). The Project workspace connects to all the required History Servers to retrieve included component information. These latter connections are maintained in a persistent manner as long as there are components in the project configuration which refer to the connected History Servers.

In addition to the History Server list maintained at each History Server, a global metadata file 518 is also maintained. This file contains the union of all schemas of the projects connected to this History Server over a period of time. The file is maintained by objects created from a class TClientMetaData. A TClientMetaData object is created each time a client project connects to the History Server and provides all the methods and protocols required to read in the schema of the client and add new component kinds and property names to the global history metadata file. As will hereinafter be explained, at the end of the connection process the TClientMetaData object returns a component kind and property name map along with an ID to the client project for future references.

The global metadata file allows the History Server to recognize changes in the client schema during the handshake which occurs in the connection of a client to a History Server.

The History Server also includes the component database 520 which, in accordance with the principles of the present invention, maintains a history or set of component versions or drafts. Each draft is uniquely identified by a component ID and a draft ID. For example, the project root component (with component ID of 0) has two drafts, draft 522 with a draft ID of 1 and draft 528 with a component ID of 0 and a draft ID of 2. Similarly, the history database contains a component with a component ID of 2 and two drafts: draft 524 with a draft ID of 1 and draft 530 with a draft ID of 2. A further component with a component ID of N has a draft ID of 1.

The THistoryServer object also includes methods which allow the component drafts to be retrieved or created and to generate a graph of relationships between component drafts or a history.

The History server interacts with the client Project workspace to store and retrieve component drafts from the component database. In addition, the History Server provides information which indicates other history servers where component drafts associated with a project are maintained. This information is encapsulated in Bridge objects.

A Bridge object references a specific draft of a component in a History Server different from the History Server which contains the root component of a Project. Therefore, the logical connectivity of a Project configuration is maintained by Bridge objects. The bridge objects are identified in the "Members" property associated with each component which identifies all members of that component. For example, if some members of a component C reside in History Servers other than the History Server on which component C is stored, then the Members property of Component C will contain the Bridges identifying these components as well as the Members stored on the History Server which stores component C.

In accordance with one illustrative embodiment of the invention, there are two types of Bridges: a Draft-Bridge represented by objects created from the class TDraftBridge and a SharedProject-Bridge represented by objects created from the class TSharedProjectBridge. A Draft-Bridge object is used to reference a History server and a specific draft of a component in that server. In addition to information encapsulated in a Draft-Bridge object, a SharedProject-Bridge object identifies a Shared Project document, where data is stored regarding a components which are shared between two Projects. Shared Projects will be discussed in more detail below. Shared Project Bridges are drafted and implemented as a special Members property.

For example, the Project root component has a special Members property and this Members property will contain the SharedProject-Bridges for each of the connected shared projects and draft-bridges for components in other history severs as well as Members local to the History Server which contains the Project root component.

The Project workspace interacts with its associated history server through three main processes: a Client-Server connection process and CreateDraft and RetrieveDraft commands. First, a Project establishes a connection to its associated server and then component drafts are created and retrieved.

CLIENT-SERVER CONNECTION

The client-server connection is initiated when a Project workspace is initialized. As previously mentioned, the workspace has persistent storage associated with it which contains information identifying the server which contains the root component for the project. Also during the process of initialization, the project schema is read in from persistent storage. The connection is established by a "handshake" process. More specifically, when a Project workspace connects to its associated History Server for the first time, the workspace communicates its schema to the History Server. The History Server compares the schema to its internal global metadata table and returns a mapping table for each component and property kind in the Project schema. Each entry in the mapping table has the workspace string token ID and the History Server string token ID for a given component or property kind. The. Project workspace uses this map whenever it needs to communicate the component or property kind to and from the History Server.

If a Project workspace is being initialized for the first time, a special method is called which attaches to a History Server and stores the Project schema and root component ID in the History Server database.

The information which is passed back and forth between the Project workspace and its associated History Server is not sent directly by the workspace to the History Server but is instead conveyed by special "agent" objects that descend from the abstract Class TAgent. The Class TAgent defines the protocol for all agents to perform jobs that require interaction between a Project workspace and one or more History Servers. In particular, in order to establish communications between a Project workspace and its associated History Server, an agent is created at the Project workspace and "sent" to the History Server. At the point when the agent is ready to be sent to the server, the agent essentially "splits". An "original" agent remains behind at the Project workspace and waits for the results to return from the History Server while a copy of the agent object is sent to the History Server. The agent copy never returns from the server.

Figure 6:
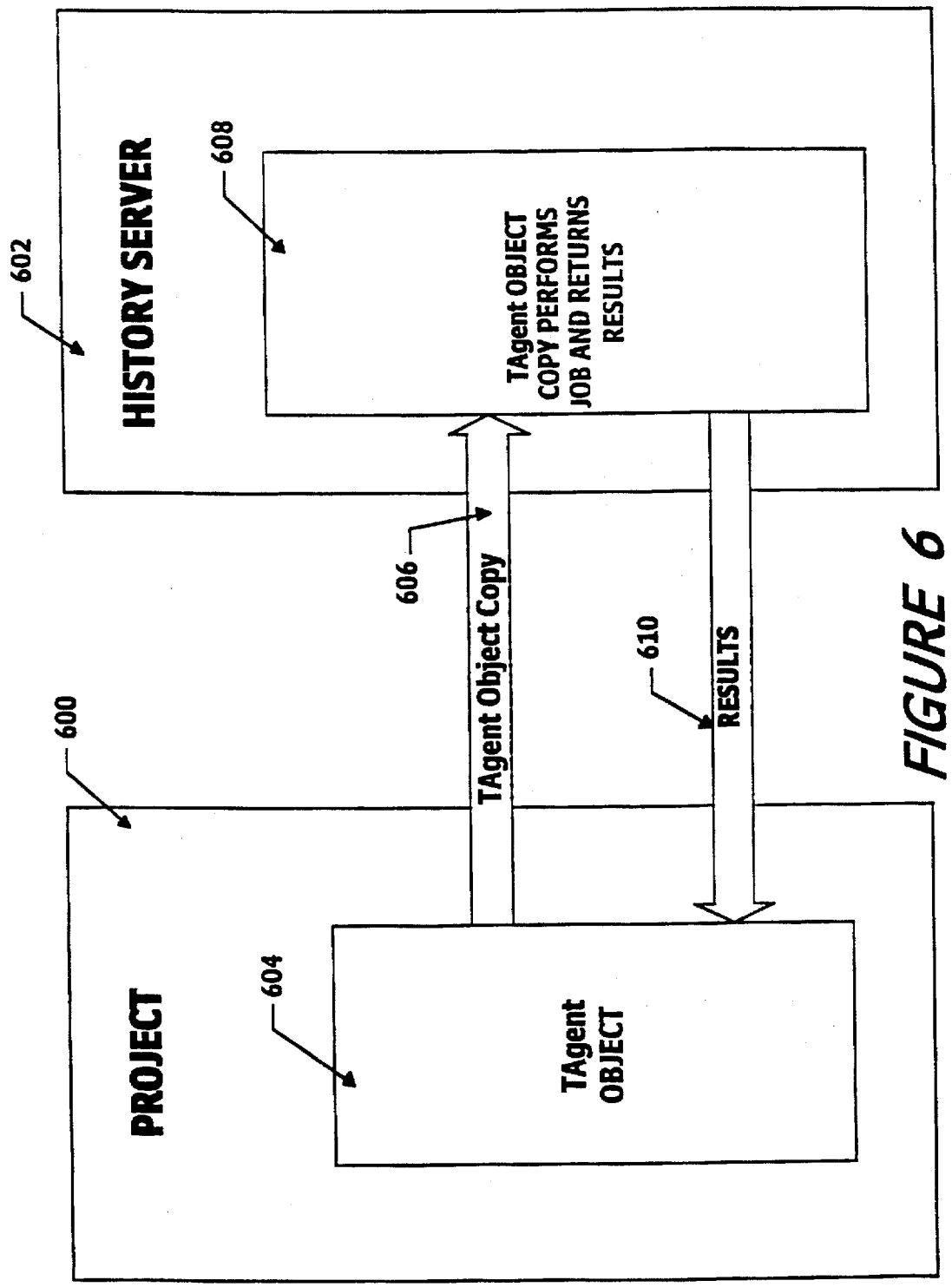
FIG. 6 is a simplified block diagram illustrating the creation of an agent object for performing transactions between a Project workspace and an associated History Server.

FIG. 6 shows, in a highly schematized form, the creation of an object descending from the TAgent class and the relationship between the Project workspace and the associated History Server. In particular a TAgent object 604 is created in the Project workspace 600. After the agent has been created, a TAgent object copy is sent to the History Server 602 as indicated schematically by the arrow 606. Once the TAgent object copy reaches the History Server 602, it performs a job and generates results as indicated schematically by box 608. The results 610 are returned to the original agent 604 as indicated by arrow 610. The TAgent object copy is destroyed at the History Server 602 and never returns.

The TAgent object comprises several internal methods which allow it to carry information to the History Server, perform a job and return results to the original agent copy located in the Project workspace. These methods include the following:

Σ HandleAssignment()
Σ JobPrologue()
Σ JobEpilogue()
Σ DoClientWriteJob()
Σ DoServerReadJob()
Σ DoServerwriteJob(). and
Σ DoClientReadJob The HandleAssignment() method is called to start the agent working. In general, this method requires a parameter which specifies the transportation path which the agent will use to travel from the Project workspace to the History Server. The agent's job will be complete upon a return from this method.

Any information from the Project workspace that will be required by the agent at the server must be prepared before the HandleAssignment() call is made. Accordingly, a JobProlog method is used to collect this information and perform any additional work prior to the agent being transported to the History Server. The companion method called JobEpilog() is called after the agent has done whatever job was required at the History Server and any results of that job have been received back at the Project workspace.

When the agent arrives at the History Server four additional methods can be called in order to perform the job that the agent has been assigned at the server. These methods are DoClientwriteJob(), DoServerReadJob, DoServerWriteJob, and DoClientReadJob and are called in the preceding order. Essentially, by using these four methods, the Project workspace writes a "request" and the server reads the "request". The server processes the request and writes the "results". Finally, the Project workspace reads the back the "results".

In order to handle the transportation back and forth from the Project workspace to the History Server, specific subclasses of the Class TAgent are instantiated to provide the actual agents which do the work. For example, a subclass called TConnectAgent, a descendent of the base Class TAgent, is used to instantiate a TConnectAgent object which performs the connection between the Project workspace and its associated History Server. This latter agent is responsible for sending the client metadata to the History Server and receiving the mapping information for the component kinds and property names back. from the server. In order to do this, the copy of the TConnectAgent object which arrives at the server contains methods which, in turn, call internal methods in the History Server that obtain the root component ID and root component draft ID of the root component associated with the project workspace.

Figure 7:
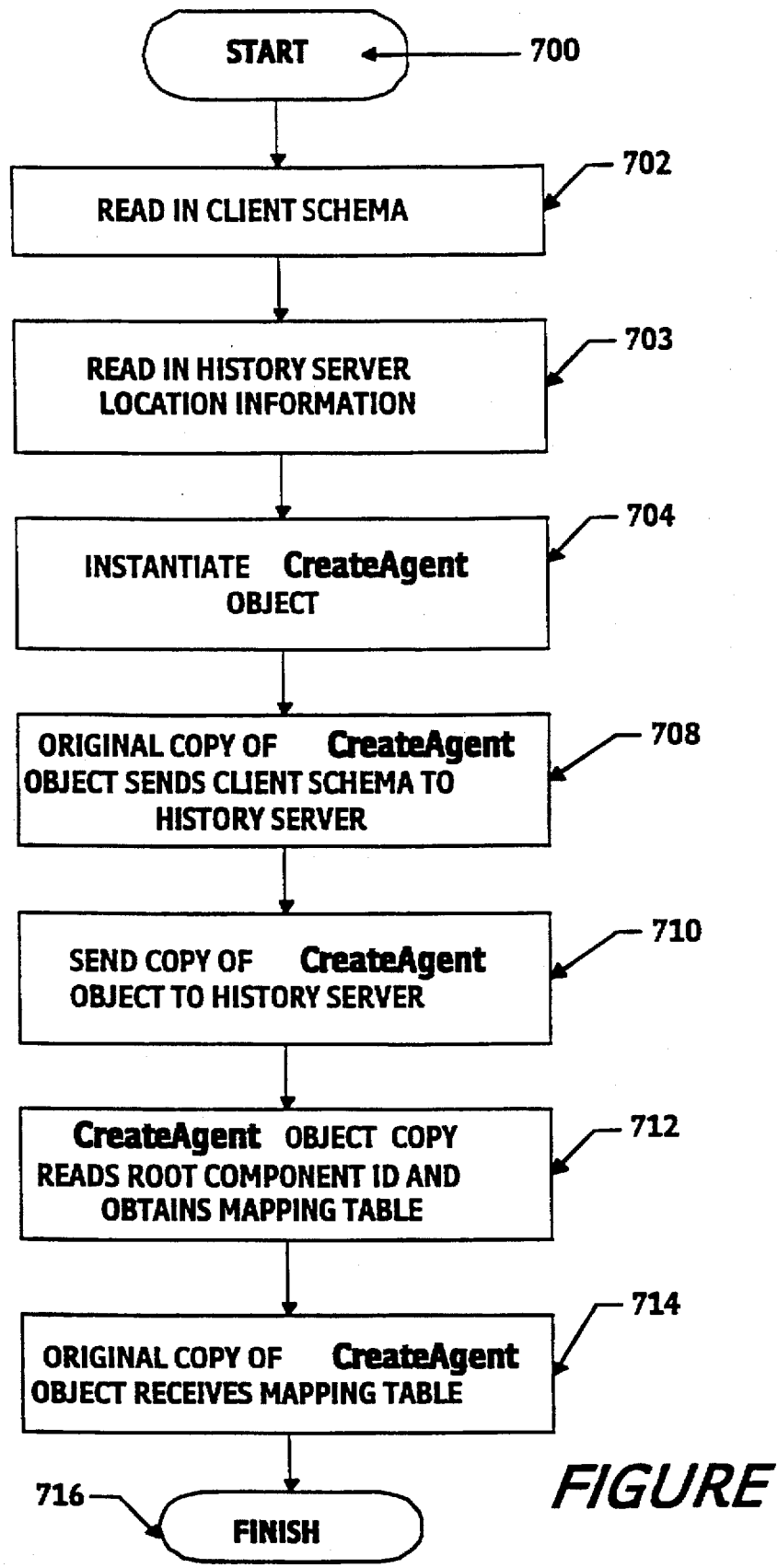
FIG. 7 is a flowchart illustrating the steps performed in connecting a Project workspace to an associated History Server.

The steps involve in establishing a connection between the Project workspace and its associated History Server are shown in more detail in FIG. 7. In particular, the connection routine starts in step 700 and proceeds to steps 702 and 703 where the Project workspace is initialized by reading in the client schema from persistent storage (as indicated in step 702), and, subsequently, reading in the History Server location information also from persistent storage as indicated in step 703.

Next, in step 704, a CreateAgent object is instantiated from the CreateAgent class previously discussed. After the object is created in step 708;, the original copy of the CreateAgent object sends the client schema to the History Server. Then, in step 710, a copy of the CreateAgent object is created and sent to the History Server.

In step 712, the CreateAgent copy reads the root component ID and obtains the mapping table (utilizing internal methods in the History Server). Next, in step 714, the original copy of the CreateAgent object receives the mapping table returned from the History Server and the connection routine finishes in step 716.

CREATE DRAFT ROUTINE

After a connection has been established between a Project workspace and its associated history server, the program developer may proceed to create and modify program components. A newly-created program component is added to the component tree in the Project workspace when it is created. The component has an internal state which is marked to indicate that the component needs to be stored or "drafted". In addition to marking the new component, each component in the new component's ancestral path is also marked to indicated that it, in turn, needs to be drafted. Propagating the NeedToDraft state in this way guarantees the consistency of the entire configuration in the Project.

The newly-created component is stored in the associated History Server database when the program developer invokes the CreateDraft command. The CreateDraft command first identifies the program components in the Project which need to be drafted. To do this, the command walks the tree starting at the project root component (using the aforementioned iterator method) and identifies each component and property whose internal state is in the NeedToDraft state. The identified components and their modified properties are then sent to their respective History Servers. Further compression of the data within the modified properties is also possible. The History Servers, in turn, create a version in which to receive the modified data and add it to their databases.

Since it is possible that the root of a subtree may belong to a different history than its parent component, As the iterator walks from the Project root to identify the components and their properties that need to be drafted, it also keeps track of the History Server associated with each component. Whenever the iterator comes across a situation where a subtree root is in a different History Server than the parent, the root of the subtree (belonging to the different Server) is not drafted in the same History Server as the parent, instead it is marked. Once all components in the parent's Server are drafted, then the marked subtrees (the ones belonging to different History Servers) are drafted in their own History Servers.

For example, consider the following component hierarchy with associated History Server assignments:

Σ Project (S0)

Σ Component A (S1)

Σ Component B (S2)

Σ Component C (S3)

In this example, the root component, Project, is assigned to History Server, S0 and the program components, A, B and C are assigned to History Servers, S1, S2 and S3, respectively.

In this case, the Project workspace will be connected to four servers, S0, S1, S2 and S3. When a CreateDraft command is invoked, by the Project into its History Server, S0, a version of the Project root component and its properties are created in History Server S0. The members property of this Project root component contains three Bridge objects, one for each of the components, A, B and C. Using the members property of the Project root component, server S0 maintains a list of the History Server references which are referred to by the stored components, in this case, these references would be to History Server S1, S2 and S3.

The drafts that are created in the History Servers in response to the CreateDraft routine have specific draft attributes including the following:

Σ Draft Name—a draft has one or more static names which are user visible and user changeable.

Σ Draft Path Name—a draft has one or more path names, these are also user visible and changeable.

Σ Draft Date—a date that identifies the data and time when the draft was created, this is user visible, but assigned by the History Server.

Σ Draft Creator—a text string that identifies the responsible user creating the draft, this is user visible and assigned by the History Server.

Σ Draft Description—text that identifies the nature of the changes to a draft, this is user visible, and changeable.

Figure 8:
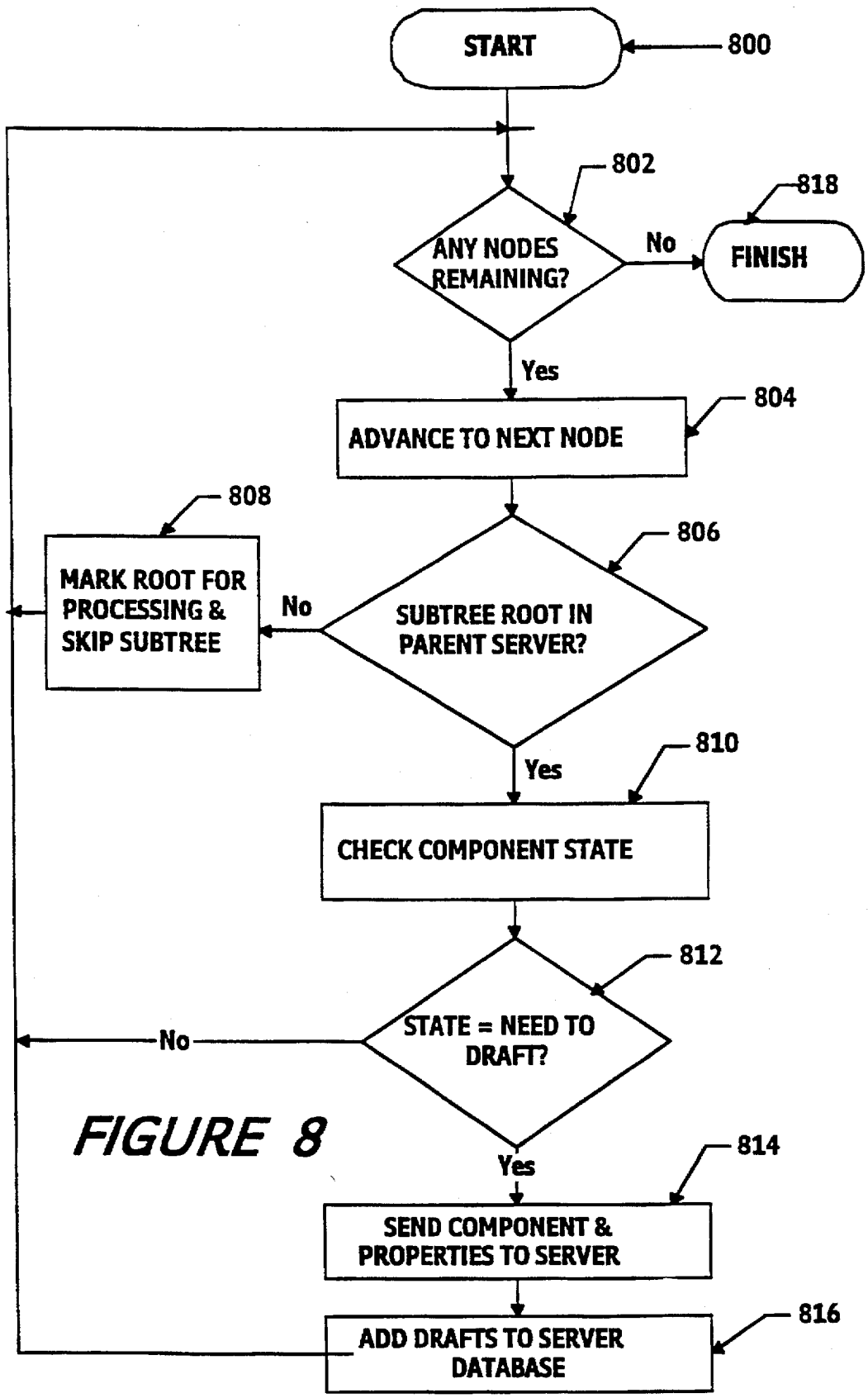
FIG. 8 is a flowchart illustrating the steps performed during a CreateDraft command.

A flowchart illustrating the basic steps which take place during the processing of a CreateDraft command is shown in FIG. 8. In particular, the CreateDraft routine starts in step 800 and proceeds to step 802 where the CreateDraft processing is controlled by an iterator which traverses the component tree located in the Project workspace. In order to process the next component, a check is made in decision step 802 whether any nodes remain. If processing is finished, the routine terminates in step 818.

If, in step 802, a decision is made that further nodes remain the iterator advances to the next subtree node in the component subtree as illustrated in step 804. Next, in decision step 806, a check is made to determine whether the subtree node is stored in the same History Server as the parent node. If not, the routine proceeds to step 808 where the subtree node (which may be a subtree root) is marked for subsequent processing and the subtree node is skipped. The routine then proceeds back to step 802 where a check is made to determine whether additional nodes require processing.

Alternatively, if in step 806, it is determined that the subtree node is located in the same History Server as the parent node then the routine proceeds to step 808 where the component state corresponding to the node is checked. If the state is in a "NeedToDraft" mode, as determined by decision step 810, then the routine proceeds to step 814 where the component and its properties are sent to the identified History Server. In step 816, the identified History Server adds the component drafts to its database and the routine then proceeds back to step 802 where a check is made to determine whether any nodes remain in the tree that have not been processed. Processing is repeated in this manner until all nodes are processed and the routine ends in step 818.

Alternatively, if, in step 812, the state of the component does not indicate that it needs to be drafted, the routine proceeds directly to step 802 to check whether any nodes in the component tree remain for processing.

The CreateDraft transactions are actually performed by agent objects created from a class descending from the TAgent class called the TCreateDraftAgent class. This agent object is sent to the associated History Server to draft all changed components in the subtree (the root of the subtree is defined by a component ID and a draft ID contained within the object) The agent drafts only those components which are stored in a given History Server; all other components or nodes are collected into a list of bridges. For every bridge in the list, bridge information is drafted which is sufficient to allow a subsequent RetrieveDraft command to fetch the real component information from the appropriate server. The caller of the subsequent RetrieveDraft command uses the bridge list to further draft those components by instantiating additional TRetrieveDraftAgent objects with appropriate arguments.

During the actual draft creation, data recovery procedures must be followed in order to prevent a program developer from losing data as a result of power failure, network partitioning, or system errors which occur during database updating. More particularly, the client-server transactions can be divided into "simple" and "composite" transactions. A simple transaction modifies, and then "commits" (makes the changes permanent) the data of a single database. For example, the changing and committing of a component draft in the project database is a "simple" transaction. Composite transactions are made up of multiple simple transactions. For example, the CreateDraft command is such a composite transaction—it can be made up of as many simple transactions as there are connected history servers.

A composite transaction has almost the same properties as a conventional distributed transaction without actually being a conventional distributed transaction. The major difference is that, in case of a conventional distributed transaction which includes subtransactions, no transaction will commits unless all of the included subtransactions commit.

In contrast, in the illustrative embodiment described herein, during the processing of a composite transaction, as many of the associated simple transactions are committed as possible. The composite transaction is deemed to be in a committed state after all its associated simple transactions are committed.

For example, assume a composite transaction G is comprised of associated subtransactions g1, g2, g3,.., gn. The various subtransactions access different databases mainly based on the location of the data items which are accessed by composite transaction G. During the processing of a composite transaction, the processing mechanism, such as the CreateDraft command, processes each subtransaction one at a time by interacting with the appropriate History Server and waits for the completion of each transaction before it processes the next subtransaction.

In a multiple database environment, such as that illustrated in FIG. 2, some mechanism must be used to recover from the failure of a subtransaction after another subtransaction of the same composite transaction has been locally committed. The mechanism used in the illustrative embodiment takes advantage of the following facts:

(a) the local databases are autonomous;

(b) there are no simple transactions outside of the composite transaction scheme; and (c) the server data is immutable.

Given these facts, the composite transaction processing mechanism only has to insure that the failed subtransaction or subtransactions are eventually completed. To provide recovery of composite transactions a conventional local recovery scheme, such as write ahead logging, is used to provide recovery for individual databases. Such a recovery scheme is described in the aforementioned U.S. Pat. No. 5,325,533. In addition, enough state information is maintained to be able to identify the state or result of each member transaction and the state of the local database. More particularly, each program component in the Project workspace maintains a "NeedToDraft" state until successfully committed in the associated History database as a result of a simple transaction. Further, as previously mentioned, each History Server associated with the root component of a project comprises a History Server Table which contains a list of the History Servers connected to the Project workspace. The History Server Table also maintains a state for each server identifying if a transaction executed on that server reached the "commit" state. At the start of processing of a CreateDraft command, the state associated with. the History Server table entry of each History Server which stores any newly created or changed components is set to a "NeedToCommit" state.

The CreateDraft command first uses the History Server Table to identify the set of History Servers involved in the composite transaction. Next, each member of a composite transaction involving one of the History Servers is processed and required to reach the commit state (receive data, and commit) before the next member is processed. If all member transactions reach the commit state, then the state entry for that History Server in the History Server Table is set to "Committed".

In case of a failure during subtransaction processing on a History Server, the state of that History Server as stored in the History Server Table will remain as "NeedToCommit". All components belonging to a History Server are assumed to be in the same state as their corresponding History Server. After processing has been completed (as far as possible) on a particular History Server, processing will pass to the next member of the composite transaction, and so on.

When processing has been completed, the History Server Table is examined and those History Servers with an entry state of "NeedToCommit" represent the pro ram components which need to be reprocessed due to a failure. These components are reprocessed to commit after the failure has been addressed.

RETRIEVE DRAFT ROUTINE

After connection to the History Server which maintains the history of a given Project, the Project workspace is empty and it is necessary to retrieve previous drafts of the program components to begin using the workspace. First, after connection to the associated History Server, the workspace can use a History/Configuration viewer routine in the Project to examine the various drafts of configurations of the Project. Once a desired draft is identified, component drafts are retrieved by invoking the RetrieveDraft Command, specifying a root component ID and a draft ID.

In response to this command, the History Server retrieves the identified root component draft stored in the database, and using the members property of the root component, walks through the root component draft and returns the included component drafts and all their draftable properties to the client Project workspace. Bridge objects which specify connections to the other servers are returned as part of the Members properties of the components.

Upon receiving the component information, the Project workspace creates components and properties from the information that the History Server has sent. The Project workspace also receives the Bridge objects, establishes the required connections, and transmit the required requests to the newly connected servers to retrieve additional component drafts.

The RetrieveDraft command may also retrieve additional drafts of a given component and its descendants for compare-merge operations. These retrieved components are called orphan components as they do not belong to the configuration of the Project workspace. The retrieval of these components are transparent to the user and initiated by GetComponento and Component Exists() commands. The GetComponent() command causes the component to be retrieved from the Project workspace. A ComponentExists() Command returns a value which indicates whether the requested component exists in the workspace. When a regular GetComponent() or ComponentExists() command fails to find the component in the workspace and there exists in the associated History Server a component with the specified component and version IDs then the workspace will automatically initiate a retrieval and return the appropriate component from the associated History Server.

An additional feature of orphan components is that the associated properties can be retrieved on-demand, optionally by the use of GetProperty() and PropertyExists() commands which parallel the GetComponent() and ComponentExists() commands. The operation of retrieving a property from its History Server is also transparent to the user, a regular GetProperty() or PropertyExists() command fails to find the requested property in the workspace, the workspace will automatically retrieve the requested property from the associated History Server.

Figure 9:
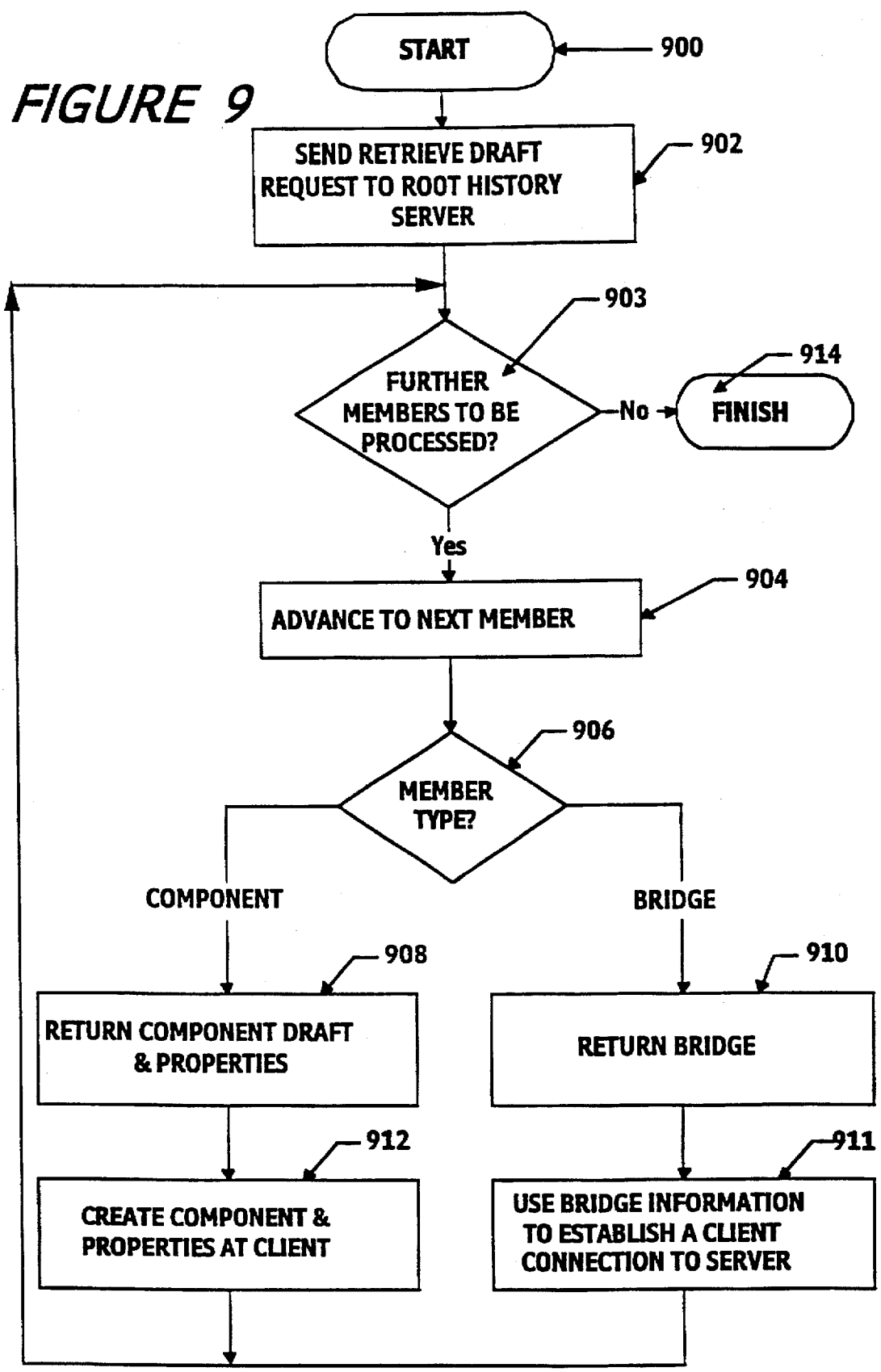
FIG. 9 is a flowchart of the steps involved in a Retrieve-Draft command.

The steps involved in processing a RetrieveDraft command are illustrated in FIG. 9. In particular, the routine starts in step 900 and proceeds to step 902 where a retrieve draft request is sent from the Project workspace the History Server which stores the Project root component. This request includes the component ID and the draft ID of the root component of the Project. In response to this request, the History Server examines, in step 903, the members property of the identified root component to determine the components which comprise the Project configuration. If, in step 903, a decision is made that there are further members to be processed, then the routine proceeds to step 904 and advances to the next member to be processed.

In step 906, the next member is examined to determine the type. If the member is a component, then the routine proceeds to step 908 where the component draft and related properties are returned to the Project workspace and, in step 912, the component and its properties are created in the Project workspace.

Alternatively, if in step 906, a determination is made that the member is a bridge object, then the routine proceeds to step 910 where the bridge object is returned to the Project workspace and, in step 911, the bridge information is used in the Project workspace to establish a connection to another History Server to retrieve additional component information.

In the case of either steps 911 or 912, the routine proceeds back to step 903 where the members property of the root component is examined for further steps to be processed. If there are further steps to be processed, then steps 904–912 are repeated. If no further members remain to be processed, then the routine terminates in step 914.

As with the connection and CreateDraft commands, information is passed between the Project workspace and the associated History Server by means of agent objects created from a class descending from the TAgent class called the TRetrieveDraftAgent class. Objects created from this class retrieve a subtree of components from a specified History Server where the root of the subtree is specified by a reference provided to the agent by the Project workspace when the agent is created. In the process of retrieval, some of the nodes may be bridges as opposed to components, but the bridges allow retrieval of other subtrees of components located in other History Servers. The copy of the TRetrieveDraftAgent object sent to the History Server simply collects all the bridges encountered and returns the bridge information to the Project workspace. As previously described, the bridge information is processed by the Project workspace.

When a component defined by a component ID and draft ID pair is retrieved, the following outcomes are possible in the Project workspace:

Σ (1) No other component with the component ID exists

Σ (2) a component with the same component ID exists but with a different draft ID and is part of the current configuration Σ (3) a component with the same component ID and draft ID exists and is part of the current configuration Σ (4) a component with the same component ID and draft ID exists, but is an orphan component Σ (5) a component with the same component ID and draft ID exists but is deleted In cases (4) and (5) above the original TRetrieveDraftAgent object which remains in the Project workspace during the RetrieveDraft transactions physically removes the component in the Project workspace before creating a new component.

In case (3) the TRetrieveDraftAgent object marks the existing component as a "SameComponent" and skips the retrieved component.

In case (2), the TRetrieveDraftAgent object marks the existing component as an "OldDraftComponent" and its subcomponents, if any, as "StaleComponents"

All of the components which get created as part of a RetrieveDraft command are marked as "RetrievedComponent" and by default all other components are marked as "NormalComponent".

The listed states help the Project workspace to decide which components should be deleted at the end of the retrieval operation. In particular all of the components marked as "StaleComponent" are deleted. In addition, all of the components marked as "OldDraftComponents" are redefined. Components marked as "NormalComponents" are left unchanged. In the case where a problem or exception occurred during the retrieval operation, the Project workspace can simply abandon the retrieval and delete all components marked as "RetrievedComponent" and reset all components in the system as "NormalComponent".

Another similar agent object is also used during a retrieval operation. It is created from a TRetrieveOrphanDraftAgent class. Its operation differs slig htly from the TRetrieveDraftAgent object in that in cases (3) and (4) listed above the TRetrieveorphanDraftAgent object skips the retrieval of the component. In all other cases the retrieval of the component is skipped.

SHARED PROJECT DRAFTING

Another way in which the system maintains build-time consistency is by keeping track of which configuration of a program's components was used to create a particular executable. This configuration information is tagged on both the executable as well as a special project used solely for the purpose of compiling, linking, and loading against that executable. This special project is called a Shared Project.

When shared projects are involved, the system communicates with and advises the user regarding the set of Shared Projects which were in use when a particular draft of the Project configuration was created. The major point of shared project drafting is to maintain a consistent operating environment regarding operations that require a specified Shared Project in a particular build operation. For example, assume that a Project build of a Component Library uses a particular Storage Library Shared Project, and the specific instance of the Component Library was drafted. In this case it is essential for the system to notify the developer regarding the usage of that Storage Library Shared Project on a subsequent retrieval of that particular draft of the Component Library.

A draft of a project component will maintain a list of Shared Project Bridges as part of its drafted Members property. Each Shared Project Bridge maintains the Component ID of the shared project root component, the draft ID of the shared project root component, History Server data required to locate and connect to the shared project's History Server and information required to create a document model required to locate and access the actual shared project document (database).

Each Shared Project will contain the following information: the component ID of the root component, the draft ID of the root component, document model data, and the History Server data identifying the server where the history of the root component of the shared project is maintained. Having this information in the Shared Project allows a developer to examine the historical information regarding Shared Project components. For example, a developer can connect to the History Server from which the components in the shared project originated, and view the history.

Conversely, the shared project is able to use the Server information to connect to the History Server and activate the appropriate history viewer.

Having this type of cross referencing between the Shared Project and the History allows the system to enforce (in an advisory manner) environment consistency.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

Having thus described our invention, what we claim, and desire to secure by Letters Patent is:

1. A method for assembling in a project workspace, a version of a program configuration comprising a plurality of software program components, each of said software components being stored in a tree structure and containing member properties including at least one draft identifier identifying a draft of said component as belonging to said program configuration version, comprising the steps of:

A. creating a program component database and storing in the program component database a plurality of program component drafts, each of said program component drafts including a draft identifier identifying said program component draft as being associated with a program configuration version;

B. using information in the project workspace to locate said program component database and send a program component request including a component draft identifier for each component belonging to said program configuration version to said program component database; and C. retrieving program component drafts from the program component database in response to said program component request using said draft identifier to identify said program component drafts belonging to said program configuration version.

2. A method according to claim 1 wherein step A comprises the step of:

A1. storing a plurality of component drafts for each component belonging to said program configuration version in the program component database; and step C comprises the step of:

C1. selecting one of the plurality of component drafts for program component retrieval.

3. A method according to claim 1 wherein step A comprises the steps of:

A2. creating a first program component database containing at least some of the components;

A3. storing some of the program component drafts associated with the program configuration version in the first component database;

A4. creating a second program component database; and

A5. storing some of the program component drafts associated with the program configuration version in the second program component database.

4. A method according to claim 3 wherein step A comprises the further step of:

A6. adding to the components located in the first program component database information for locating the second program component database.

5. A method according to claim 4 further comprising the steps of:

D. retrieving the information for locating the second program component database from the components in the first program component database; and E. retrieving program component drafts from the second program component database.

6. A method according to claim 1 wherein the software program components are comprised of a plurality of component kinds and property kinds and wherein the method further comprises the step of:

F. storing the plurality of component kinds and property kinds in the project workspace.

7. A method according to claim 6 further comprising the step of:

G. sending the plurality of component kinds and property kinds from the project workspace to the program component database.

8. A method for assembling in a project workspace, a plurality of software program component drafts comprising a program configuration version over a client server network, the method comprising the steps of:

A. creating a history server;

B. connecting the history server to the network;

C. creating in the history server a program component database for storing a plurality of program component drafts each of the program component drafts including a component ID and a draft ID identifying the program component draft as being associated with a program configuration version;

D. creating a client terminal containing the project workspace, a draft ID associated with the program configuration version and means for locating the history server on the network;

E. connecting the client terminal to the network;

F. sending a program component request from the project workspace to the history server; and G. retrieving program component drafts from the program component database in response to the program component request using the draft ID to identify program component drafts belonging to the program configuration version.

9. A method according to claim 8 wherein step A comprises the step of:

A1. creating a plurality of history servers;
step B comprises the step of:
B1. connecting each history server to the network; and
step C comprises the steps of:
C1. storing some of the program component drafts belonging to the program configuration version on a first history server;
C2. storing some of the program component drafts belonging to the program configuration on a second history server; and
C3. storing in the component drafts belonging to the program configuration version on the first history server information for locating the second history server on the network.

10. A method according to claim 9 wherein step C1 comprises the steps of:

C1A. storing in the first history server a component containing a list of program component drafts for the component belonging to the program configuration version which are located on the first history server; and C1B. storing information in the component for locating the second history server on the network.

11. A method according to claim 8 further comprising the step of:

H. displaying a graph of program component drafts.

12. A method according to claim 11 wherein the component comprises a list of program component drafts belonging to the program configuration version and wherein step G comprises the step of:

G1. iterating through the program component draft list in response to the program component request.

13. A method according to claim 8 wherein step D comprises the steps of:

D1. creating in the client terminal a tree structure with branches; and

D2. adding program component drafts retrieved from the history server to the branches.

14. A method according to claim 8 wherein the program component drafts have component properties and component kinds and wherein step D further comprises the step of:

D3. storing the component properties and the component kinds in the client terminal.

15. Apparatus for use on a computer system with a memory, the apparatus assembling in a project workspace, a version of a program configuration comprising a plurality of software program components, each of the software components being stored in a tree structure and containing member properties including at least one draft identifier identifying a draft of the component as belonging to the program configuration version, the apparatus comprising:

a program component database in the memory including a plurality of program component drafts, each of the program component drafts including a draft identifier identifying the program component draft as being associated with a program configuration version;

means responsive to information in the project workspace for locating the program component database and for sending a program component request including a component draft identifier for each component belonging to the program configuration version to the program component database; and means responsive to the program component request for retrieving program component drafts from the program component database using the draft identifier to identify the program component drafts belonging to the program configuration version.

16. Apparatus according to claim 15 wherein the program component database includes a plurality of component drafts for each component belonging to the program configuration version in the program component database; and retrieving means comprises means for selecting one of the plurality of component drafts for program component retrieval.

17. Apparatus according to claim 15 wherein the program component database comprises:

first program component database containing at least some of the components and some of the program component drafts associated with the program configuration version; and a second program component database containing some of the program component drafts associated with the program configuration version.

18. Apparatus according to claim 17 wherein the first program component database includes information for locating the second program component database.

19. Apparatus according to claim 18 further comprising:

means for retrieving the information for locating the second program component database from the components in the first program component database; and means for retrieving program component drafts from the second program component database.

20. A computer program product for use in a computer system having a memory, the computer program product assembling in a project workspace, a version of a program configuration comprising a plurality of software program components, each of the software components being stored in a tree structure and containing member properties including a at least one draft identifier identifying a draft of the component as belonging to the program configuration version, the computer program comprising a computer usable medium having computer readable program code thereon including:

program code for creating a program component database in the memory and program code storing in the program component database a plurality of program component drafts, each of the program component drafts including a draft identifier identifying the program component draft as being associated with a program configuration version;

program code for using information in the project workspace to locate the program component database and send a program component request including a component draft identifier for each component belonging to the program configuration version to the program component database; and program code for retrieving program component drafts from the program component database in response to the program component request using the draft identifier to identify the program component drafts belonging to the program configuration version.

21. A computer program product according to claim 20 wherein the program code for creating a program component database comprises program code for storing a plurality of component drafts for each component belonging to the program configuration version in the program component database; and wherein the program code for retrieving program component drafts comprises program code for selecting one of the plurality of component drafts for program component retrieval.

22. A computer program product according to claim 20 wherein the program code for creating a program component database comprises:

program code for creating a first program component database containing at least some of the components;

program code for storing some of the program component drafts associated with the program configuration version in the first component database;

program code for creating a second program component database; and program code for storing some of the program component drafts associated with the program configuration version in the second program component database.

23. A computer program product according to claim 22 wherein the program code for creating a program component database comprises program code for adding to the components located in the first program component database information for locating the second program component database.

24. A computer program product according to claim 23 further comprising:

program code for retrieving the information for locating the second program component database from the components in the first program component database; and program code for retrieving program component drafts from the second program component database.

* * * * *